(No Model.)  2 Sheets—Sheet 1.

J. Y. SMITH.
MANURE SPREADER.

No. 309,987. Patented Dec. 30, 1884.

Witnesses.
A. Ruppert.
H. J. England.

J. Y. Smith
Inventor
Holloway & Blanchard
Attys (No Model.) 2 Sheets—Sheet 2.

J. Y. SMITH.
MANURE SPREADER.

No. 309,987. Patented Dec. 30, 1884.

Witnesses.
A. Ruppert.
J. W. Garner

Inventor:
J. Y. Smith
per
Holloway & Blanchard
Attys

UNITED STATES PATENT OFFICE.

JOHN Y. SMITH, OF DOYLESTOWN, PENNSYLVANIA.

MANURE-SPREADER.

SPECIFICATION forming part of Letters Patent No. 309,987, dated December 30, 1884.

Application filed April 6, 1883. (No model.)

*To all whom it may concern:*

Be it known that I, JOHN Y. SMITH, a citizen of the United States, residing at Doylestown, in the county of Bucks and State of Pennsylvania, have invented certain new and useful Improvements in Manure-Spreaders, of which the following is a specification, reference being had therein to the accompanying drawings.

My invention relates to improvements in manure spreaders; and the objects of my improvements are, first, to provide a wheeled vehicle for transporting manure from points where it is deposited to where it is distributed, to which there is attached machinery for the distribution thereof in varied and regulated quantities; second, to provide such devices and combinations thereof as will produce the results herein described. I attain these objects by the mechanism illustrated in the accompanying drawings, in which—

Figure 1:
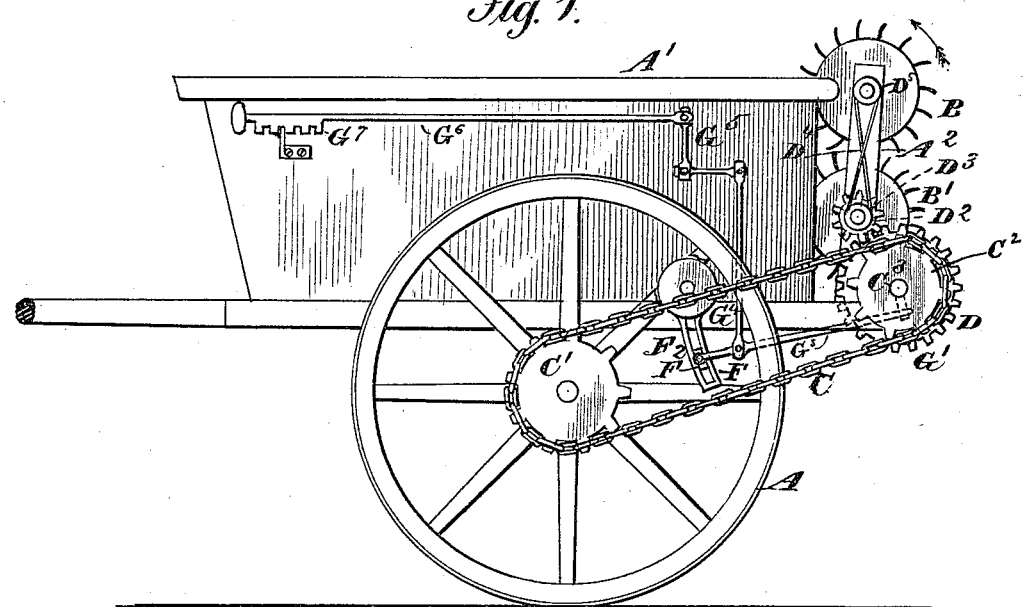
Figure 2:
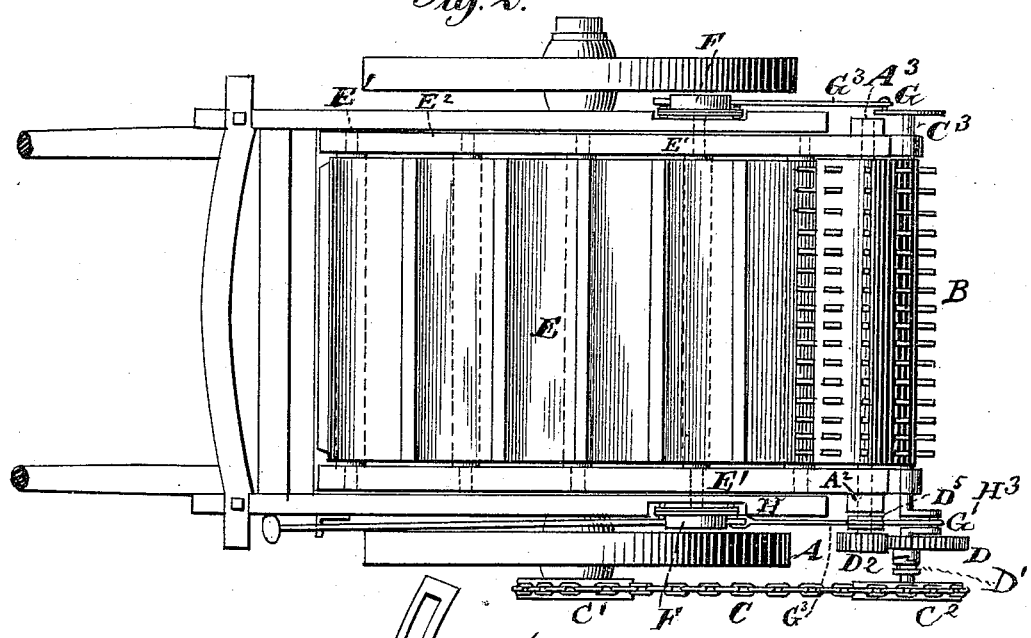
Figure 3:
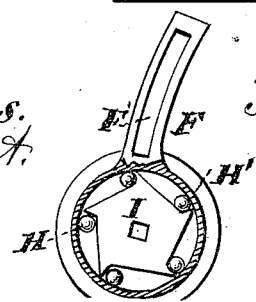
Figure 5:
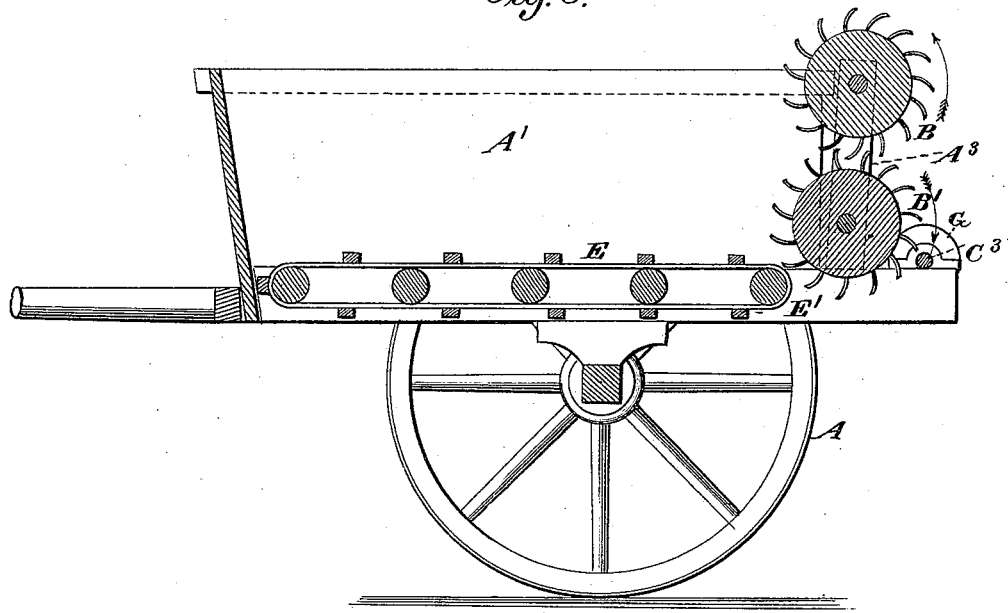
Figure 4:
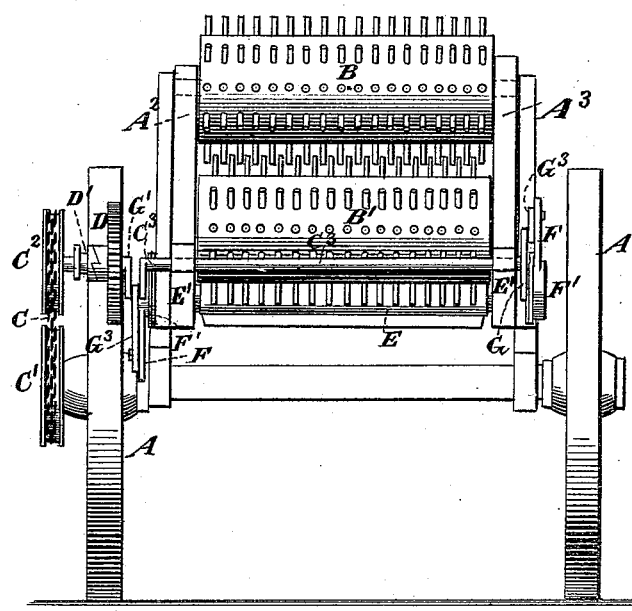

Figure 1 is an elevation showing my improved implement having carrying-wheels, a body or receptacle for containing the manure, and mechanism for distributing the same. Fig. 2 is a plan view showing the parts in position, and Fig. 3 is a detailed view showing a device for changing the quantity of material distributed on a given area of ground. Fig. 4 is a rear end elevation. Fig. 5 is a vertical longitudinal section.

Similar letters refer to similar parts throughout the several views.

In constructing implements of this type I provide two or more carrying-wheels, A, and place thereon a receptacle, A', into which the material is placed for transportation, said receptacle resting upon a suitable frame upon the axle or axles of the frame, which is supplied with shafts when arranged for a single animal, or with a tongue when more than one is employed. The shafts of the implement extend rearward from the hind end of the receptacle A' sufficiently far to enable them or it to form or have placed thereon bearings for receiving and supporting distributing rollers or wheels, as shown in Fig. 1, those lettered B B' being carried in brackets $A^2$ $A^3$, secured to the shafts, and extending upward therefrom far enough to enable them to carry both of the distributing-rollers, which are, by preference, driven by an endless chain or belt, C, which passes around a sprocket or other wheel, C', secured to the hub of one or more of the carrying-wheels, from which part or parts it extends to and passes over a similar wheel, $C^2$, which is fast upon a central shaft, $C^3$, carried in bearings fixed in or upon the rear ends of the shafts or frame of the implement. The central shaft, $C^3$, also has secured upon the end thereof which is adjacent to the sprocket-wheel a gear-wheel, D, the outer portion of the hub of which is provided with a portion of a clutch, D', the outer portion of which is made to move or slide horizontally upon said shaft, in order that it may be thrown out of contact with the gear-wheel D, when it is desirable to move the implement from place to place without causing it to distribute the material, but which is brought into gear therewith when such distribution becomes necessary. The outer portion of this clutch is provided with a feather or key fixed in the shaft upon which it is placed, and a spline which provides for its being moved horizontally, as above stated, but which prevents it from rotating on said shaft. The wheel D is placed loosely upon the shaft and meshes with and drives a pinion, $D^2$, secured upon this shaft of the lower distributing roller or wheel, B', which also carries a pulley, $D^3$, over which passes a crossed belt, $D^4$, the upper end of which passes over a pulley, $D^5$, secured upon the outer end of the shaft which carries the distributing-wheel B, and so gives to it a movement corresponding to that applied to the one B'.

Within the receptacle A', and at or near its lower surface, or it may constitute its lower surface, there is placed an endless apron, E, which may consist of a band of leather, canvas, or any other pliable material, the outer surface of which is provided with slats for carrying the material to the distributing rollers or wheels.

The endless apron above described is carried upon a series of rollers, the journals E' of which rest in a frame, $E^2$, placed in the receptacle A'. It is important that implements of this character shall be provided with mechanism for distributing varying quantities of material, in order that provision may be made for depositing less upon ground that is comparatively fertile than it does upon soil which is sterile. In making provision for such unequal distribution at times, there is placed upon one of the rollers, or upon a projecting portion of its shafts, an arm, F, having in it a curved slot, F', in which there is placed a sliding block, F², which is capable of being moved in said slot, so that it can be placed at a point near the shaft when the quantity of material to be distributed is large, and farther from it as it is desirable to decrease the amount. This arm, by preference, is placed upon the shaft of the roller which is nearest to the distributing rollers or wheels, but it may be placed upon the one forward thereof by providing said last-named roller with a roughened surface or with pins, for causing it to move the apron in such a manner as to push forward the material to the distributing-rollers.

For the purpose of giving to the rollers which move the apron a continuous movement, there is placed upon both of its ends an arm, F, such as is above described, the projecting portions of which are placed at an angle of one hundred and eighty degrees to each other, so that as one of the arms is being carried in the direction required to carry the material to the distributing rollers or wheels, the other may be carried in the opposite direction preparatory to being again carried in the direction for giving the feeding movement to the rollers or wheels B B'. The movements of the arms F F are effected by means of cranks G G', formed in or placed upon the shaft C³, one upon each of its ends, to which rods G³ are connected in such a manner that the outer ends shall turn freely upon the crank-pins, from which parts said rods extend to and are pivoted to the block F², which moves in the slotted arms F.

As a means of adjusting the blocks so as to give the various amounts of movement required to the feeding-apron, there is connected to one of the connecting-rods G³ a link, G⁴, the upper end of which is attached to a bell-crank lever, G⁵, that is pivoted to the receptacle A', and from it there extends a rod, G⁶, the outer end being provided with a handle and with a projection, G⁷, in which there is formed a series of notches that engage with a stop attached to the reservoir A', as shown in Fig. 1, so that by moving said handle it will cause the curved arm to be moved a greater or less distance at each revolution of the shaft C³, the effect of which will, as above described, be to force more or less material to the distributing-rollers at each revolution of said shaft, the rod, and consequently the parts connected therewith, being held in their adjusted positions by the stop with which the notched end of said handle engages. Instead of slotting the arms F, as shown, it may be made solid or without a slot, and of any desired form in cross-section, and the block F² be made to embrace said arm, the moving rods being connected thereto, as herein described. The circular portion of the arm F is, by preference, made to move in a casing which forms a receptacle for a friction-wheel, I, as shown in Fig. 3, between which and the projecting flange of the arm there is placed a series of balls, H H', for the purpose of allowing a backward movement of one of the arms until the other one and the shaft on which it is placed, as well as the friction-wheel I, are being moved forward. Any other form of friction may, however, be used that will admit of the proper movement of the shaft and its friction-wheels.

Having thus described my invention, what I claim, and desire to secure by Letters Patent, is—

1. In a manure-spreader having distributing devices, in combination with a manure-receptacle and an endless apron passing over rollers, slotted curved arms F, each arm being provided with a sliding block, F², with connecting-rod G³, crank, and driving mechanism, link G, bell-crank, and an adjustable rod, G⁶, substantially as and for the purposes described.

2. In combination with a manure-receptacle and an endless apron, with rollers carrying said apron, a friction-wheel, I, on one of the shafts of said rollers, said wheel being in a casing provided with a slotted curved arm, F, and having a number of balls, H', therein, the adjustable sliding block connected by rod and crank with the driving mechanism, substantially as and for the purposes described.

3. A friction-wheel for manure-spreaders, consisting of a circular hollow case having an extended curved and slotted arm, and a pointed angular wheel formed to move on balls within said case, substantially as shown and specified.

4. In a manure-spreader, the distributers B and B', having reverse motion, the gear-wheels D and D², the sprocket-wheels C' and C², and the chain C, in combination with the wheel I, having slotted arm F, the connecting-rods G³ and G⁴, the crank-lever G⁵, the notched rod G⁷, and the stop G⁶, substantially as shown and described.

In testimony whereof I affix my signature in presence of two witnesses.

JOHN Y. SMITH.

Witnesses:
H. J. ENGLAND,
J. W. HAMILTON JOHNSON.